G. Walker.
Saw.

No. 73210  Patented Jan. 7, 1868.

Witnesses.
Thos Tusche
J. Alison Fraser

Inventor.
G Walker
Per Munn & Co
Attorneys

United States Patent Office.

GEORGE WALKER, OF MIDDLETOWN, NEW YORK.

Letters Patent No. 73,210, dated January 7, 1868.

---

IMPROVEMENT IN SAWS.

---

*The Schedule referred to in these Letters Patent and making part of the same.*

---

TO ALL WHOM IT MAY CONCERN:

Be it known that I, GEORGE WALKER, of Middletown, in the county of Orange, and State of New York, have invented a new and useful Improvement in Saws; and I do hereby declare that the following is a full, clear, and exact description thereof, which will enable others skilled in the art to make and use the same, reference being had to the accompanying drawings, and to the letters of reference marked thereon.

This invention relates to a new and useful improvement in saws, both reciprocating and circular, whereby fixed teeth are made to possess all the advantages of the insertible teeth which are now coming into general use, and with far less expense, both as regards the first cost of the manufacture of the saw and the expense of keeping the same in perfect working order.

The invention consists in providing the saw, either circular or reciprocating, with teeth of the usual form, but instead of having the cutting-edges formed at the points or angles of the teeth, as hitherto, I drill a hole into the tooth, at or near where the cutting-edges of the teeth now are, and insert a steel rod, the outer end of which is grooved or sharpened to form the cutting-edge. In the accompanying sheet of drawings—

Figure 1:
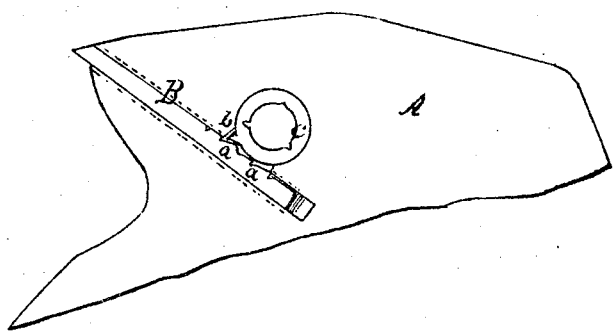

Figure 1 is a side view of a tooth of a circular saw.

Figure 2:
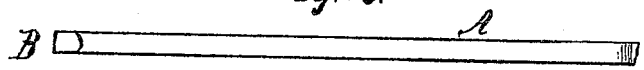

Figure 2, an edge view of the same.

Figure 3:
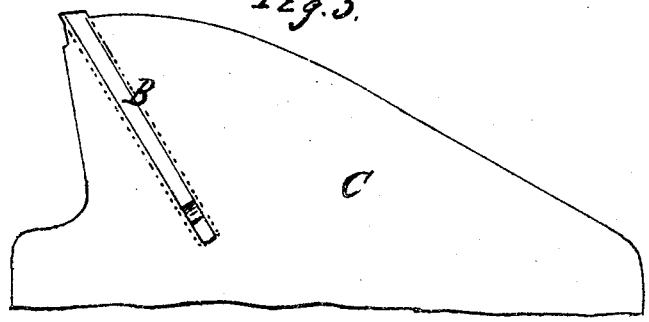

Figure 3, a side view of the tooth of a reciprocating saw.

Figure 4:
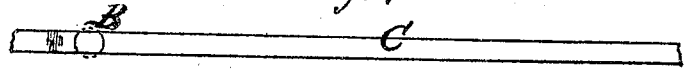

Figure 4, an edge view of the same.

Similar letters of reference indicate like parts.

A, figs. 1 and 2, represents a view of the tooth of a circular saw, which may be of the usual shape, but at its angle or point, where the cutting-edge is at present formed, I drill a hole directly into the tooth in an oblique direction, the diameter of the hole being greater than the width of the saw, so that when a steel wire or rod, B, is driven in said hole it will project outward from each side of the saw, as shown in fig. 4. This wire or rod, after being thus inserted in the tooth, is ground off at each side of the tooth in order that it may be flush therewith. This steel wire or rod is sharpened at its outer end, and forms the cutting-edge of the tooth; and as the tooth is shortened by wear it is driven outward, so that the cutting-edge will always have a proper relative position with the tooth.

In case friction is not sufficient to retain the wire or rod in proper place, or prevent it being driven backward in the hole in the tooth, notches, $a$, may be made in one edge of the wire or rod, and a pawl, $b$, made to engage with one of the notches. This pawl is formed on an annular rivet, $c$, inserted in the tooth, and may be turned by inserting a key in it, the pawl being inserted in the notch $a$, which will keep the outer end or cutting-edge of the wire or rod in proper position with the tooth.

The wire or rod B is inserted in the tooth C of the reciprocating saw in substantially the same way, due regard, of course, being had to the proper inclination of the wire or rod, the position of the latter varying with the rake or pitch of the tooth.

Having thus described my invention, I claim as new, and desire to secure by Letters Patent—

The annular rivet $c$ inserted in the side of the saw-tooth, engaging with the notches $a$ upon the cutter B, whereby the latter is held in the groove of the tooth, as herein shown and described.

GEORGE WALKER.

Witnesses:
J. M. H. LITTLE,
GEO. G. MCCHESNEY.